United States Patent
Tian et al.

(10) Patent No.: US 10,133,061 B2
(45) Date of Patent: Nov. 20, 2018

(54) LASER DEVICE

(71) Applicant: BOE TECHNOLOGY GROUP CO., LTD., Beijing (CN)

(72) Inventors: Xiangjun Tian, Beijing (CN); Xueyong Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 339 days.

(21) Appl. No.: 15/141,302

(22) Filed: Apr. 28, 2016

(65) Prior Publication Data

US 2017/0059815 A1 Mar. 2, 2017

(30) Foreign Application Priority Data

Jul. 14, 2015 (CN) .......................... 2015 1 0413152

(51) Int. Cl.
| | |
|---|---|
| *G02B 27/00* | (2006.01) |
| *H01S 3/034* | (2006.01) |
| *H01H 3/08* | (2006.01) |
| *H01S 3/08* | (2006.01) |

(52) U.S. Cl.
CPC .......... *G02B 27/0006* (2013.01); *H01S 3/034* (2013.01); *H01S 3/0346* (2013.01); *H01S 3/08059* (2013.01)

(58) Field of Classification Search
CPC ................................... G02B 27/0006
USPC .................. 359/587, 381; 372/103
See application file for complete search history.

(56) References Cited

U.S. PATENT DOCUMENTS

| | | | | |
|---|---|---|---|---|
| 4,278,324 | A | * 7/1981 | Zipfel | ............... G02B 7/004 248/487 |
| 4,486,886 | A | * 12/1984 | Ream | ................. H01S 3/034 359/509 |
| 4,993,042 | A | 2/1991 | Mehmke et al. | |
| 6,069,909 | A | * 5/2000 | Miller | ................. H01S 3/034 372/10 |
| 6,493,375 | B1 | * 12/2002 | Kodeda | ............... H01S 3/086 372/107 |
| 6,768,765 | B1 | 7/2004 | Schroeder et al. | |

(Continued)

FOREIGN PATENT DOCUMENTS

| | | |
|---|---|---|
| CN | 101431208 A | 5/2009 |
| CN | 102244339 A | 11/2011 |
| CN | 102699529 A | 10/2012 |

(Continued)

OTHER PUBLICATIONS

First Office Action regarding Chinese Application No. 201510413152.9, dated Jul. 3, 2017. Translation provided by Dragon Intellectual Property Law Firm.

*Primary Examiner* — Kimberly N Kakalec

(74) *Attorney, Agent, or Firm* — Harness, Dickey & Pierce, P.L.C.

(57) ABSTRACT

A laser device is provided. The laser device includes: a laser tube having an opening in both ends thereof, and a fixing apparatus on at least one of the ends of the laser tube. The opening in at least one of the ends of the laser tube is sealed by the fixing apparatus. A movable assembly and a window are provided on the fixing apparatus. The window is movable relatively to the opening of the laser tube when being driven by the movable assembly, to change a transmission position of a laser light generated by the laser tube on the window.

19 Claims, 2 Drawing Sheets

(56) References Cited

U.S. PATENT DOCUMENTS

2014/0269794 A1* 9/2014 Murray ............... H01S 3/0014
372/33

FOREIGN PATENT DOCUMENTS

| CN | 202962222 U | 6/2013 |
|----|-------------|--------|
| CN | 103219229 A | 7/2013 |
| CN | 203950784 U | 11/2014 |
| CN | 104379820 A | 2/2015 |

\* cited by examiner

LASER DEVICE

CROSS-REFERENCE TO RELATED APPLICATION

This disclosure claims priority to Chinese Patent Application No. 201510413152.9, filed with the Chinese State Intellectual Property Office on Jul. 14, 2015, which is incorporated by reference in its entirety herein.

TECHNICAL FIELD

The disclosure relates to the field of laser technology, and in particular to a laser device.

BACKGROUND

A laser device is a device capable of emitting a laser light. With development of science and technology, the laser device is widely applied in various technical fields, such as medical treatments, military affairs, industries and communications.

There is a laser device in the related art, which includes: a laser tube having an opening on both ends thereof, and a fixing apparatus. The laser tube is full-filled with a mixed gas consisting of Xe, Ne, He and the like. The fixing apparatus is provided on both ends of the laser tube for sealing the openings on the ends. A window (which is generally formed of transparent material) is fixedly provided on the fixing apparatus. The laser light generated in the laser tube can be transmitted out via the window.

It is discovered by the inventor during implementation of the disclosure that, the above approach has at least the following disadvantage. For the above laser device, in operation, a high temperature induced at a transmission position of the laser light on the window will cause the mixed gas to leave a pollutant at the transmission position, and thus the window needs to be cleared regularly. However, the work load for clearing the window is huge, thereby affecting the working efficiency of the laser device.

SUMMARY

To solve the issue in the related art that the window needs to be cleared regularly, but the work load for clearing the window is huge, thereby affecting the working efficiency of the laser device, it is provided a laser device in the disclosure. The technical solutions are as follows.

In an aspect of the disclosure, a laser device is provided. The laser device includes: a laser tube having an opening in both ends thereof, and a fixing apparatus on at least one of the ends of the laser tube. The opening in at least one of the ends of the laser tube is sealed by the fixing apparatus. The fixing apparatus includes a movable assembly and a window, with the window being movable relatively to the opening of the laser tube when being driven by the movable assembly, to change a transmission position of a laser light generated by the laser tube on the window.

Optionally, the window may be strip-shaped, and may be movable in a length direction of the window when being driven by the movable assembly.

Optionally, a length direction of the laser tube may be perpendicular to the window.

Optionally, the window may be annular-shaped, and may be rotatable around an axis of the window when being driven by the movable assembly.

Optionally, the opening of the laser tube may be located on a circumference centered around the axis of the window.

Optionally, a length direction of the laser tube may be perpendicular to the window.

Optionally, a through hole may be provided in the fixing apparatus, and may be sealed by the window.

Optionally, the laser device may further include a sealing assembly; and the fixing apparatus may be abutted by the sealing assembly against the opening of the laser tube, so as to seal the opening.

Optionally, the window may be abutted by the sealing assembly against the through hole, so as to seal the through hole.

Optionally, the sealing assembly may include a piston and a cylinder, where the cylinder may be able to push the piston to press and abut the window against the through hole, and the cylinder may be able to push the piston to drive the fixing apparatus to be pressed against the opening of the laser tube.

Optionally, a damping assembly may be provided on the piston, and may be configured to protect the window when the piston presses the window.

Optionally, the laser device may further include a sealing ring located between the through hole and the window.

Optionally, the movable assembly may include a motor and a scroll wheel, where the motor may be mechanically connected to the scroll wheel and is able to drive the scroll wheel to roll; and the scroll wheel may be in contact with the window, and the scroll wheel when rolling may be able to drive the window to move.

Optionally, the fixing apparatus may further include a body having a hollow cavity; the window may be movably provided in the body and through the cavity; a through hole may be formed in the body, the through hole is provided correspondingly to the opening of the laser tube and is in communication with the cavity; and the opening of the laser tube and the window may be located on opposite sides of the through hole.

Optionally, the laser device may further include a first sealing ring and a second sealing ring; the first sealing ring may be provided between the body and the laser tube and may seal the opening of the laser tube and the through hole; and the second sealing ring may be provided in the cavity and may be located between the window and the through hole.

Optionally, the laser device may further include: a piston slidably provided in the chamber, and a cylinder driving the piston to move toward or away from the window in the chamber.

Optionally, the movable assembly may include a motor and a scroll wheel which are provided in the chamber; the motor may be mechanically connected to the scroll wheel, and may be able to drive the scroll wheel to roll; and the scroll wheel may be in contact with the window, and the scroll wheel when rolling may be able to drive the window to move.

Optionally, the opening of the laser tube, the first sealing ring, the through hole, the second sealing ring and the piston may be provided in this order in a length direction of the laser tube.

Optionally, the length direction of the laser tube may be perpendicular to the window.

Optionally, the laser device may further include a sealing ring; and the laser tube may be connected to the fixing apparatus in a sealing manner via the sealing ring.

The technical solutions provided in the disclosure may have following beneficial effects.

With the movable assembly provided on the fixing apparatus, the window is able to change the transmission position of the laser light on the window, thereby solving the issue in the related art that the window needs to be cleared regularly, but the work load for clearing the window is huge, thereby affecting the working efficiency of the laser device; and thereby achieving the effects that the laser device is operable continuously for a long time.

It is to be understood that, the above general description and the following detailed description are only illustrative and explanatory, and are not intended to limit the disclosure.

BRIEF DESCRIPTION OF THE DRAWINGS

The appended drawings herein, which are incorporated into the specification and are integral components of the specification, illustrate embodiments conforming to the disclosure and explain the principle of the disclosure together with the specification.

FIG. 2-1 is a schematic structural diagram of another laser device according to one embodiment of the disclosure;

FIG. 2-2 is a left view of a fixing apparatus in the laser device shown in FIG. 2-1; and FIG. 2-3 is a left view of another fixing apparatus which can be applied in the laser device shown in FIG. 2-1.

Figure 1:
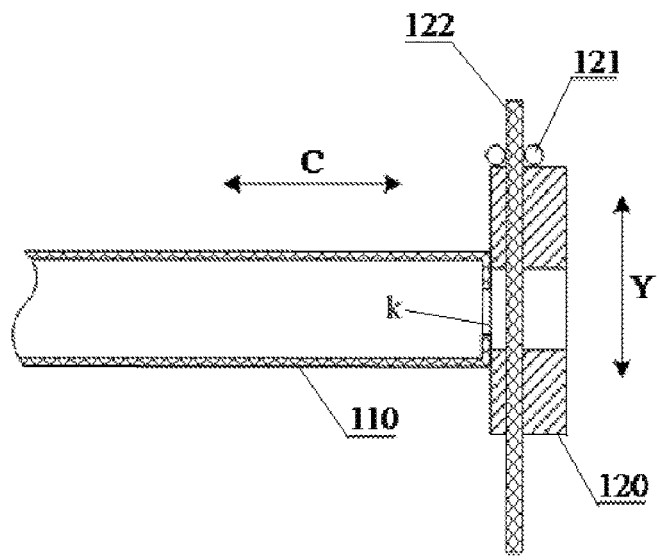
FIG. 1 is a schematic structural diagram of a laser device according to one embodiment of the disclosure.

With the above drawings, explicit embodiments of the disclosure are illustrated, which will be described in further detail hereinafter. These drawings and text descriptions are not to limit the scope of the design of the disclosure in any way, but to explain the concept of the disclosure for those skilled in the art with reference to the specific embodiments.

DETAILED DESCRIPTION

The exemplary embodiments will be described in detail herein, the examples of which are illustrated in the drawings. When the following descriptions refer to the drawings, the same number in different drawings denotes the same or similar element, unless otherwise stated. The embodiments described in the following exemplary embodiments do not represent all the embodiments consistent with the disclosure. Rather, the embodiments are only examples of the apparatus and method consistent with some aspects of the disclosure as detailed in the appended claims.

FIG. 1 is a schematic structural diagram of a laser device according to one embodiment of the disclosure. The laser device may include: a laser tube 110 having an opening on both ends thereof, and a fixing apparatus 120.

At least one of the ends of the laser tube 110 is provided with the fixing apparatus 120. The opening k on at least one of the ends of the laser tube 110 is sealed by the fixing apparatus 120. In a case where only one of the ends of the laser tube 110 is provided with the fixing apparatus 120, for the manner for sealing the opening on the other one of the ends of the laser tube, reference may be made to related techniques.

A movable assembly 121 and a window 122 are provided on the fixing apparatus 120. The window 122 is movable relatively to the opening k of the laser tube 110 when being driven by the movable assembly 121, to change a transmission position of a laser light generated by the laser tube 110 on the window 122. An exit direction of the laser light generated by the laser tube 110 may be in parallel with a length direction C of the laser tube 110. A moving direction Y of the movable assembly 121 may be perpendicular to the exit direction of the laser device.

In total, in the laser device according to one embodiment of the disclosure, with the movable assembly being provided on the fixing apparatus, the window is able to change the transmission position of the laser light on the window, thereby solving the issue in the related art that the window needs to be cleared regularly, but the work load for clearing the window is huge, thereby affecting the working efficiency of the laser device; and thereby achieving the effects that the laser device is operable continuously for a long time.

Figures 1, 2:
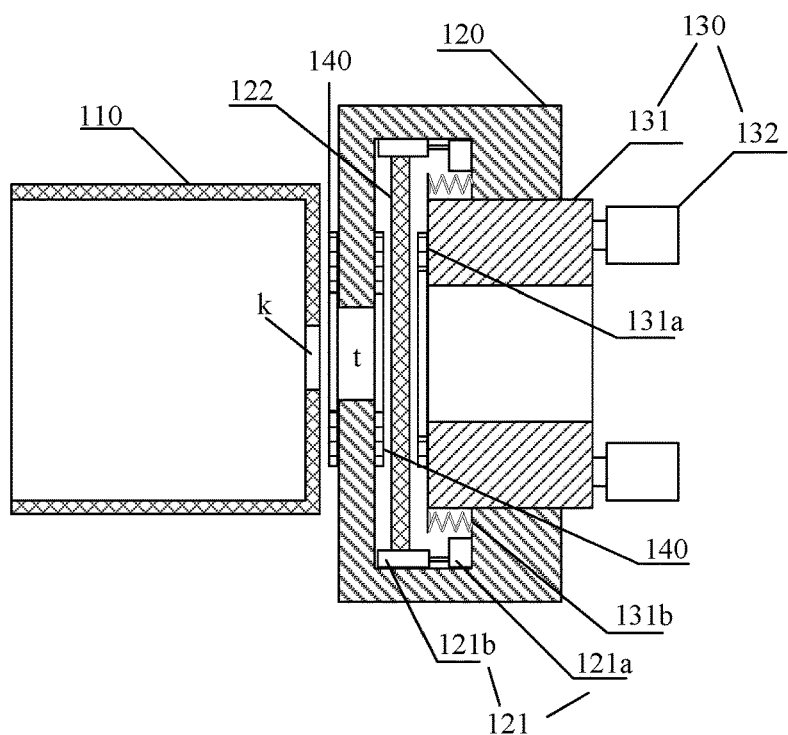
Figure 2:
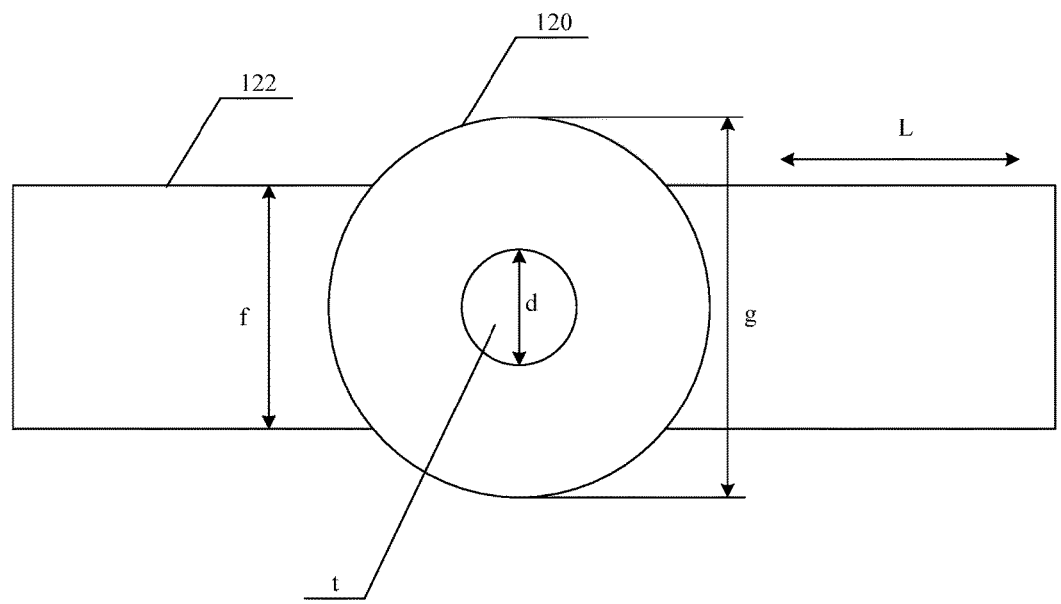

Further, referring to FIG. 2-1, which shows a schematic structural diagram of another laser device according to one embodiment of the disclosure, a more preferred component is added as compared with the laser device shown in FIG. 1, so that the laser device according to this embodiment of the disclosure has better performance.

Optionally, a through opening t is provided in the fixing apparatus 120, and is sealed by the window 122. The laser light generated by the laser tube 110 may pass through the window 122 through the through hole t. Optionally, each of the ends of the laser tube 110 may be provided with the fixing apparatus 120.

Optionally, the laser device further includes a sealing assembly 130. The fixing apparatus 120 is abutted by the sealing assembly 130 against the opening k of the laser tube 110, so as to seal the opening k.

Optionally, the window 122 is abutted by the sealing assembly 130 against the through hole t, so as to seal the opening t.

Optionally, the sealing assembly 130 includes a piston 131 and a cylinder 132.

The cylinder 132 is able to push the piston 131 to press and abut the window 122 against the through hole t, and the cylinder 132 is able to push the piston 131 to drive the fixing apparatus 120 to be pressed against the opening k of the laser tube 110. In this case, the window 122 is fixed at the through hole t by the piston 131, so that the through hole t is sealed by the window 122, and the fixing apparatus 120 is also able to seal the opening k. The laser tube 110 is generally fixed, and an operator is able to control the sealing between the fixing device 120 and the laser tube 110 via the cylinder 132.

Optionally, a damping assembly 131a is provided on the piston 131, and is configured to protect the window 122 from being damaged by the piston 131 when the piston 131 presses the window 122. The damping assembly 131a may be an O-shaped circle.

Optionally, a spring 131b may be further provided on the piston 131. When the cylinder 132 pushes the piston 131 to press the window 122, the spring 131b is extended. When the cylinder 132 stops pushing the piston 131, the spring 131b may contract and restore the piston 131.

Optionally, the movable assembly 121 includes a motor 121a and a scroll wheel 121b. The motor 121a is mechanically connected to the scroll wheel 121b and is able to drive the scroll wheel 121b to roll. The scroll wheel 121b is in contact with the window 122, and the scroll wheel 121b when rolling is able to drive the window 122 to move. If it is to move the window 122, the cylinder 132 may be controlled to stop pushing the piston 131, thereby removing the sealing between the window 122 and the through hole t. Then, the motor 121a drives the scroll wheel 121b to rotate, thereby moving the window 122.

Optionally, the laser device further includes a sealing ring 140, through which the laser tube 110 is connected to the fixing apparatus 120 in a sealing manner, thereby increasing the sealing performance at the opening k. Optionally, a position where the window 122 is abutted against the through hole t may also be provided with the sealing ring 140, for improving the sealing performance at the through hole t.

Optionally, as shown in FIG. 2-2, which is a left view of the fixing apparatus 120 in the laser device shown in FIG. 2-1, the window 122 is strip-shaped, and the window 122 is movable in a length direction L of the window 122 when being driven by the movable assembly (not shown in FIG. 2-2), to change the transmission position of the laser light. The fixing apparatus 120 is circle shaped, the through hole t is circle shaped, and a width f of the window 122 is greater than a diameter d of the through hole t, so that the window 122 is able to seal the through hole t completely. In addition, the width f of the window 122 is less than a diameter g of the fixing apparatus 120, to facilitate providing the window 122 on the fixing apparatus 120. The sealing ring is not shown in FIG. 2-2.

Figures 2, 3:
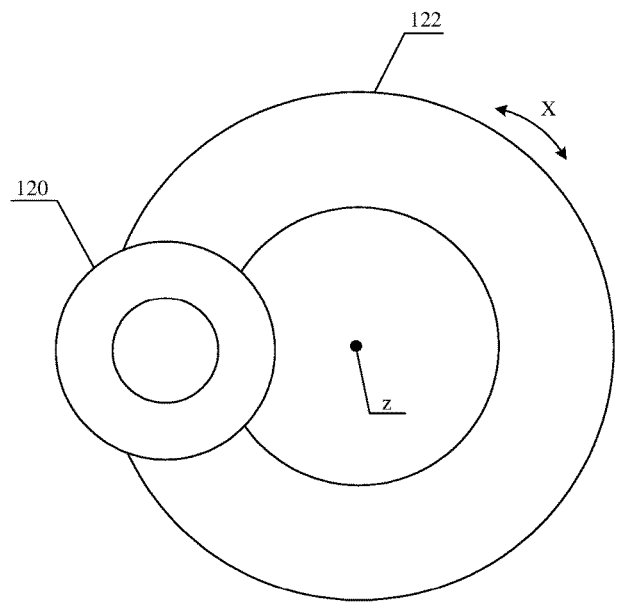

Alternatively, the window 122 may be annular shaped. In this case, as shown in FIG. 2-3, the window 122 is rotatable around an axis z (which is perpendicular to the paper) of the window 122 when being driven by the movable assembly (not shown in FIG. 2-3). The rotation direction X may be the clockwise direction or the anticlockwise direction. It is to be noted that, the window 122 may be of other shape, which is not limited in the embodiment of the disclosure.

A method for using the laser device according to the embodiment of the disclosure will be described by taking FIG. 2-1 as an example.

The laser device is enabled. The laser light generated in the laser tube 110 is transmitted through the window 122, and induces an increased temperature at the transmission position of the laser light on the window 122. Due to the high temperature at the transmission position, the mixed gas in the laser tube 110 leaves a pollutant at the transmission position gradually. The pollutant will affect the quality of the laser light that has transmitted through the window 122. Generally, before the lifetime of the mixed gas expires, it needs to change the transmission position of the laser light. In the related art, when cleaning or replacing the window, it generally needs to detach the fixing apparatus as a whole. However, the mixed gas in the laser tube will be polluted by the external gas without the sealing from the fixing apparatus. Therefore, after cleaning or replacing the window, it needs to full-fill the laser tube with the mixed gas again before the laser tube is sealed by the fixing apparatus again, and a large amount of mixed gas is wasted during the lifetime of the mixed gas in the laser tube, thereby increasing the cost for cleaning or replacing the window. In addition, in the related art, the time required to clean the window is relatively long. By taking the 4.5 generation of ELA (Excimer Laser Annealing) as an example, it takes two people 5 hours to clean the window, thereby significantly affecting the operation efficiency of the laser device.

With the laser device provided in the embodiment of the disclosure, when it is to change the transmission position of the laser light generated by the laser tube 110, the cylinder 132 is firstly controlled to press the piston 131, to remove the sealing of the opening k by the fixing apparatus 120. Due to the air pressure of the mixed gas in the laser tube 110, the mixed gas will overflow from the laser tube 110 after the sealing of the opening k by the fixing apparatus 120 is removed, and the mixed gas may be injected into the laser tube 110 continuously via an inlet opening provided on the laser tube 110, thereby providing the air pressure in the laser tube 110 and thus preventing the external gas from entering the laser tube 110. Then, the window 122 is moved by the movable assembly 121, to change the transmission position of the laser light. After the window 122 is moved to a preset position, the cylinder 132 is controlled to press the piston 131, so that the opening k is sealed by the fixing apparatus 120 again, thereby changing the transmission position. The laser device may operate normally continuously. The whole procedure only takes a short period of time, only a small amount of mixed gas is wasted, and the down time of the laser device is shortened significantly.

It is to be additionally noted that, with the laser device provided in the embodiment of the disclosure, the window is fixed at the through hole by the movable sealing assembly, thereby conveniently moving the window to change the transmission position of the laser light.

In total, in the laser device provided in the embodiment of the disclosure, with the movable assembly provided on the fixing apparatus, the window is able to change the transmission position of the laser light on the window, thereby solving the issue in the related art that the window needs to be cleared regularly, but the work load for clearing the window is huge, thereby affecting the working efficiency of the laser device; and thereby achieving the effects that the laser device is operable continuously for a long time.

The above are only preferred embodiment of the disclosure, but not intend to limit the disclosure. Any modifications, equivalents, improvements and the like, which are made within the spirit and principle of the disclosure, should be contained in the scope of protection of the disclosure.

What is claimed is:

1. A laser device, comprising:
   a laser tube having an opening in both ends thereof; and
   a fixing apparatus on at least one of the ends of the laser tube;
   wherein the opening in at least one of the ends of the laser tube is sealed by the fixing apparatus; and
   wherein the fixing apparatus comprises a movable assembly and a window, with the window being movable relatively to the opening of the laser tube when being driven by the movable assembly, to change a transmission position of a laser light generated by the laser tube on the window;
   wherein the window is annular-shaped, and is rotatable around an axis of the window when being driven by the movable assembly.

2. The laser device according to claim 1, wherein the opening of the laser tube is located at a circumference centered around the axis of the window.

3. The laser device according to claim 1, wherein a length direction of the laser tube is perpendicular to the window.

4. The laser device according to claim 1, wherein the fixing apparatus comprises a through hole, and the through hole is sealed by the window.

5. The laser device according to claim 4, further comprising a sealing assembly;
   wherein the fixing apparatus is abutted by the sealing assembly against the opening of the laser tube, so as to seal the opening.

6. The laser device according to claim 5, wherein the window is abutted by the sealing assembly against the through hole, so as to seal the through hole.

7. The laser device according to claim 6, wherein the sealing assembly comprises a piston and a cylinder;
   wherein the cylinder is able to push the piston to press and abut the window against the through hole, and the cylinder is able to push the piston to drive the fixing apparatus to be pressed against the opening of the laser tube.

8. The laser device according to claim 7, further comprising a damping assembly on the piston; wherein the damping assembly is configured to protect the window when the piston presses the window.

9. The laser device according to claim 6, further comprising a sealing ring between the through hole and the window.

10. The laser device according to claim 1, wherein the movable assembly comprises a motor and a scroll wheel;
wherein the motor is mechanically connected to the scroll wheel and is able to drive the scroll wheel to roll; and
the scroll wheel is in contact with the window, and the scroll wheel when rolling is able to drive the window to move.

11. The laser device according to claim 1, wherein the fixing apparatus further comprises a body having a hollow chamber;
the window is movably provided in the body and through the chamber;
the body comprises a through hole; the through hole corresponds to the opening of the laser tube and is in communication with the chamber; and
the opening of the laser tube and the window are on opposite sides of the through hole.

12. The laser device according to claim 11, further comprising a first sealing ring and a second sealing ring;
wherein the first sealing ring is between the body and the laser tube and seals the opening of the laser tube and the through hole; and
the second sealing ring is in the chamber and is between the window and the through hole.

13. The laser device according to claim 12, further comprising: a piston slidably provided in the chamber, and a cylinder driving the piston to move toward or away from the window in the chamber.

14. The laser device according to claim 13, wherein the movable assembly comprises a motor and a scroll wheel which are in the chamber;
the motor is mechanically connected to the scroll wheel, and is able to drive the scroll wheel to roll; and
the scroll wheel is in contact with the window, and the scroll wheel when rolling is able to drive the window to move.

15. The laser device according to claim 13, wherein the opening of the laser tube, the first sealing ring, the through hole, the second sealing ring and the piston are provided in this order in a length direction of the laser tube.

16. The laser device according to claim 15, wherein the length direction of the laser tube is perpendicular to the window.

17. The laser device according to claim 1, further comprising a sealing ring; wherein the laser tube is connected to the fixing apparatus in a sealing manner via the sealing ring.

18. A laser device, comprising:
a laser tube having an opening in both ends thereof; and
a fixing apparatus on at least one of the ends of the laser tube;
wherein the opening in at least one of the ends of the laser tube is sealed by the fixing apparatus; and
wherein the fixing apparatus comprises a movable assembly and a window, with the window being movable relatively to the opening of the laser tube when being driven by the movable assembly, to change a transmission position of a laser light generated by the laser tube on the window;
wherein the fixing apparatus comprises a through hole, and the through hole is sealed by the window;
wherein the laser device further includes a sealing assembly; and the fixing apparatus is abutted by the sealing assembly against the opening of the laser tube, so as to seal the opening;
wherein the window is abutted by the sealing assembly against the through hole, so as to seal the through hole;
wherein the sealing assembly comprises a piston and a cylinder; and the cylinder is able to push the piston to press and abut the window against the through hole, and the cylinder is able to push the piston to drive the fixing apparatus to be pressed against the opening of the laser tube.

19. A laser device, comprising:
a laser tube having an opening in both ends thereof; and
a fixing apparatus on at least one of the ends of the laser tube;
wherein the opening in at least one of the ends of the laser tube is sealed by the fixing apparatus; and
wherein the fixing apparatus comprises a movable assembly and a window, with the window being movable relatively to the opening of the laser tube when being driven by the movable assembly, to change a transmission position of a laser light generated by the laser tube on the window;
wherein the fixing apparatus further comprises a body having a hollow chamber; the window is movably provided in the body and through the chamber; the body comprises a through hole; the through hole corresponds to the opening of the laser tube and is in communication with the chamber; and the opening of the laser tube and the window are on opposite sides of the through hole;
wherein the laser device further includes a first sealing ring and a second sealing ring; the first sealing ring is between the body and the laser tube and seals the opening of the laser tube and the through hole; and the second sealing ring is in the chamber and is between the window and the through hole;
wherein the laser device further includes a piston slidably provided in the chamber, and a cylinder driving the piston to move toward or away from the window in the chamber.

* * * * *